United States Patent [19]
Nolan

[11] Patent Number: 5,902,620
[45] Date of Patent: May 11, 1999

[54] APPARATUS AND METHOD FOR MAKING BEVERAGES IN A MICROWAVE OVEN

[75] Inventor: Patrick B Nolan, Danbury, Conn.

[73] Assignee: HP Intellectual Corp., Miami Lakes, Fla.

[21] Appl. No.: 09/024,478

[22] Filed: Feb. 17, 1998

[51] Int. Cl.[6] .............................. H05B 6/80; A47J 31/00
[52] U.S. Cl. .................. 426/241; 99/302 R; 99/303; 99/DIG. 14; 219/689; 426/433
[58] Field of Search .................... 426/241, 243, 426/433; 99/302 R, 303, DIG. 14; 219/688, 689, 732

[56] References Cited

U.S. PATENT DOCUMENTS

| | | | |
|---|---|---|---|
| 3,757,670 | 9/1973 | Lombard et al. | 99/302 R |
| 4,098,176 | 7/1978 | Perez | 99/303 |
| 4,167,899 | 9/1979 | McCormick | 99/302 R |
| 4,381,696 | 5/1983 | Koral | 219/689 |
| 4,386,109 | 5/1983 | Bowen et al. | 426/241 |
| 4,498,375 | 2/1985 | Bedini | 99/303 |
| 4,642,443 | 2/1987 | Jorgensen et al. | 219/689 |
| 4,908,222 | 3/1990 | Yu | 219/689 |
| 4,990,734 | 2/1991 | Hirsch et al. | 219/689 |
| 4,999,466 | 3/1991 | Waligorski | 219/689 |
| 5,028,753 | 7/1991 | Shariat | 219/689 |
| 5,049,713 | 9/1991 | Creyaufmuller | 426/241 |
| 5,079,396 | 1/1992 | Katz et al. | 219/689 |
| 5,104,666 | 4/1992 | Sanvitale | 99/303 |
| 5,281,785 | 1/1994 | Pasbrig | 219/689 |
| 5,434,392 | 7/1995 | Belinkoff | 426/241 |
| 5,463,935 | 11/1995 | Zanarini | 99/305 |
| 5,467,690 | 11/1995 | Zappala et al. | 99/303 |
| 5,586,484 | 12/1996 | Piazza | 426/433 |
| 5,634,394 | 6/1997 | Cortese | 99/302 R |
| 5,636,563 | 6/1997 | Oppermann et al. | 99/285 |

*Primary Examiner*—George Yeung
*Attorney, Agent, or Firm*—Barry E. Deutsch

[57] ABSTRACT

An apparatus for preparing beverages comprises a liquid container and a drink medium container including a housing having a tubular member extending downward into the liquid container. The drink medium container includes a filter apparatus capable of containing a drink medium. A drink container includes a tubular liquid inlet in fluid flow communication with the drink medium container. The liquid container is in fluid communication with the drink container such that when liquid in the liquid container is heated, the liquid can flow upward from the liquid container through the tubular member, filter apparatus, and through the tubular liquid inlet into the drink container. The liquid container includes a double wall construction to maintain the temperature on an outer surface thereof at a relatively low level. The drink container includes an outer surface having longitudinally extending grooves which function to direct steam venting from the liquid container upwardly and away from the outer surface of the liquid container.

14 Claims, 3 Drawing Sheets

APPARATUS AND METHOD FOR MAKING BEVERAGES IN A MICROWAVE OVEN

BACKGROUND OF THE INVENTION

This invention relates to a hot beverage making device, and in particular to one which is suitable for making coffee and espresso in a microwave oven.

Hot drink makers suitable for us in a microwave oven, such as disclosed in U.S. Pat. No. 5,281,785, have heretofore been known. Such beverage makers generally include a liquid container or reservoir, a filter basket, and a drink container. A drink medium, such as coffee grind, is placed in the filter basket and liquid, such as water, is placed in the liquid container. The liquid container is made of a material which is permeable to microwaves. The liquid container, filter apparatus, and drink container are in fluid flow communication. The liquid in the liquid container is subjected to microwaves, which heats the liquid and converts a portion thereof into steam. The liquid flows through the filter basket into the drink container.

The heat generated by the microwave raises the temperature of the outer surface of the liquid container to a relatively high level, which, if touched by the user immediately after the microwave cycle has been completed, will result in the user's discomfort. In addition, part of the steam generated in the liquid container during the microwave cycle and immediately thereafter, is vented. Unrestrained or undirected steam venting may result in the user being discomforted by exposure to steam.

It is accordingly an object of this invention to design a hot drink maker, particularly suitable for use in a microwave oven which substantially eliminates the possibility of user discomfort by maintaining external gripping areas at relatively low temperature levels and directing vent steam away from such gripping areas.

SUMMARY OF THE INVENTION

The foregoing object and other objects of the invention are attained in an apparatus for preparing hot beverages which includes a liquid container. A filter apparatus includes a housing and a tubular member extending downward from the housing into the liquid container. The housing includes a filter capable of containing a drink medium. A drink container is positioned above the drink medium container and includes a tubular liquid inlet in fluid flow communication with the drink medium container. The liquid container is in fluid communication with the drink container so that fluid can flow upward from the liquid container through the tubular member, the filter apparatus, and through the tubular liquid inlet into the drink container. The liquid container is formed from a material permeable to microwaves. The liquid container comprises a first outer cylindrical member and a second cylindrical member radially inwardly spaced from the first cylindrical member. The second cylindrical member includes an inner surface forming the liquid container.

In a preferred embodiment, longitudinally extending grooves are formed on an outer surface of the drink container.

The objects of the present invention are also attained by a method of making a beverage in a microwave oven comprising the steps of placing a liquid into a liquid container; placing a drink medium into a drink medium holder; assembling the drink medium holder into the liquid container; joining the drink holder and liquid container to a drink container in an assembly permitting fluid flow therebetween; defining a user finger gripping section on an outer surface of the liquid container; insulating the finger gripping section of the liquid container from the liquid containing portion thereof; placing the beverage maker into a microwave oven; activating the oven to subject the liquid in the liquid container to microwave energy; heating the liquid and converting a portion thereof to steam; and maintaining the temperature of the finger gripping section at a relatively low temperature level while the container is subjected to microwave energy.

The method of making a beverage may also include partially disassembling the liquid container from the drink container after the microwave oven has been deactuated; and directing steam venting from the partially disassembled liquid container upwardly away from the finger gripping section.

DESCRIPTION OF THE PREFERRED EMBODIMENT

Figure 1:
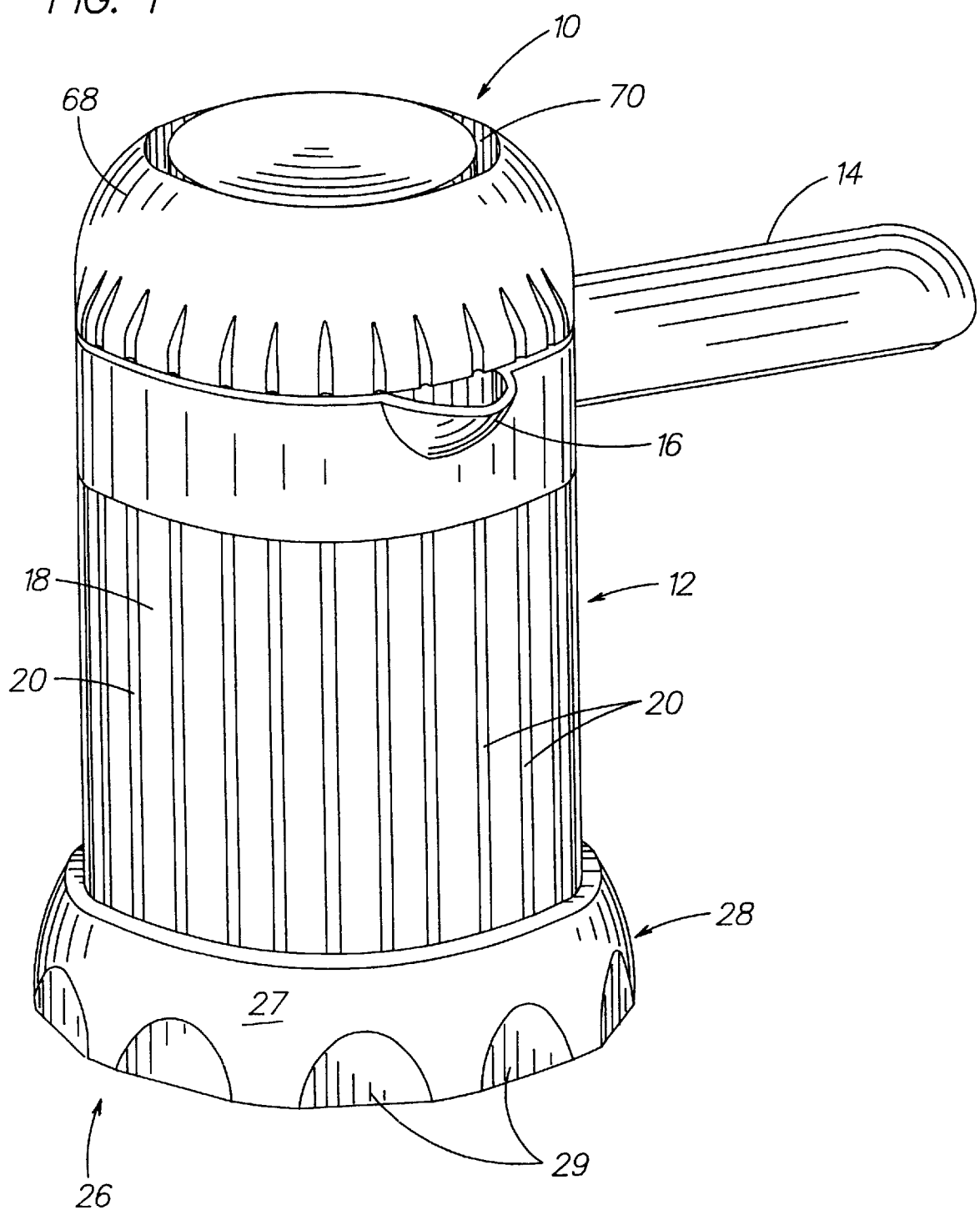
FIG. 1 is a perspective view of a hot beverage making device embodying the invention.

Referring now to the drawing, there is disclosed a preferred embodiment of the present invention. In referring to the various figures of the drawing, like numerals shall refer to like parts.

The present invention illustrates a hot beverage maker 10 which is particularly suitable for making beverages, such as espresso, coffee, and the like, in a microwave oven. Hot beverage maker or coffeemaker 10 includes a filtrate or drink container 12. Container 12 includes an outer sleeve 18 including a plurality of longitudinally extending grooves 20 formed on outer sleeve 18 and an inner shell 19. A spout 16 is formed at the top of container 12. A cap 68 is removably connected to container 12. Cap 68 includes sleeve 69 and inner shell 67. A handle 14 is joined to the top of container 12 in substantially the same horizontal plane as spout 16. The material used to form inner shell 19 of liquid container 12 is preferably a polyester blend, sold under the trademark "NOREL" by the General Electric Company. The material used to form an inner shell (not shown) of cap 68 is preferably polypropolene. The material used to make sleeves 18 and 69 is a polypropolene-rubber mix sold under the trademark "Santoprene" by Advanced Elastomer Systems.

Coffeemaker 10 includes a water reservoir or water container 26 comprising an outer cylindrical member 28. Member 28 includes an outer surface 27 having finger grip details 29 spaced circumferentially thereabout. Water container 26 is also preferably manufactured from "NOREL". Outer surface 27 is preferably tapered, with finger grip details 29 being formed on the diametrically widest portion of the surface.

Figure 2:
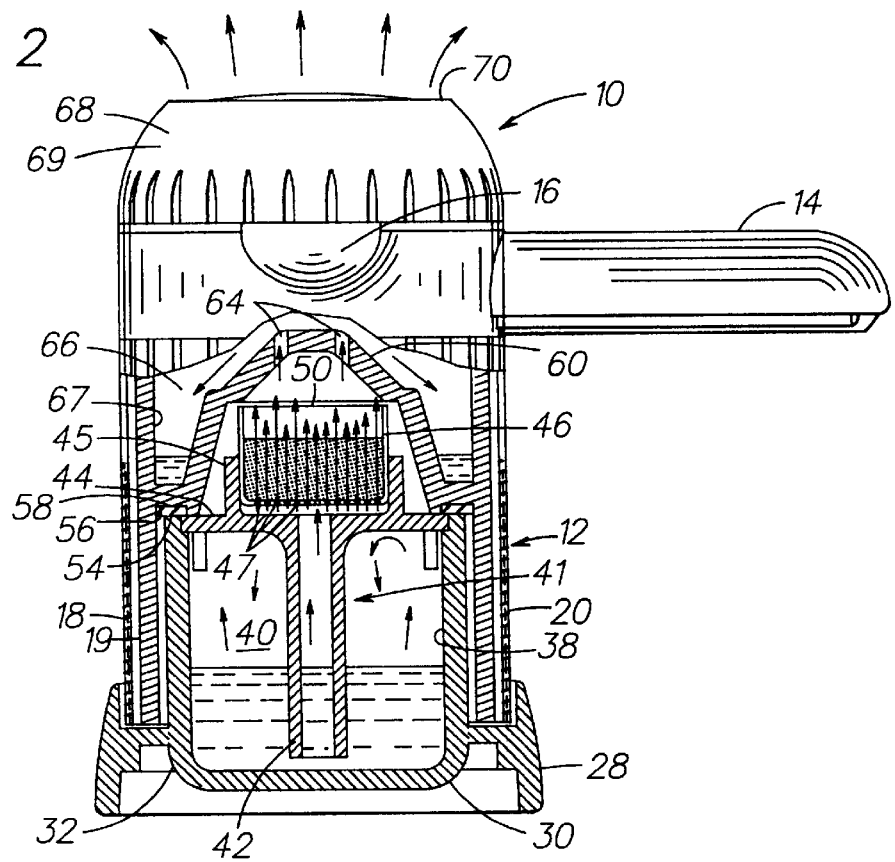
FIG. 2 is a longitudinal view, partially in section, of the hot beverage maker illustrated in FIG. 1 in a first operating position.
Figure 3:
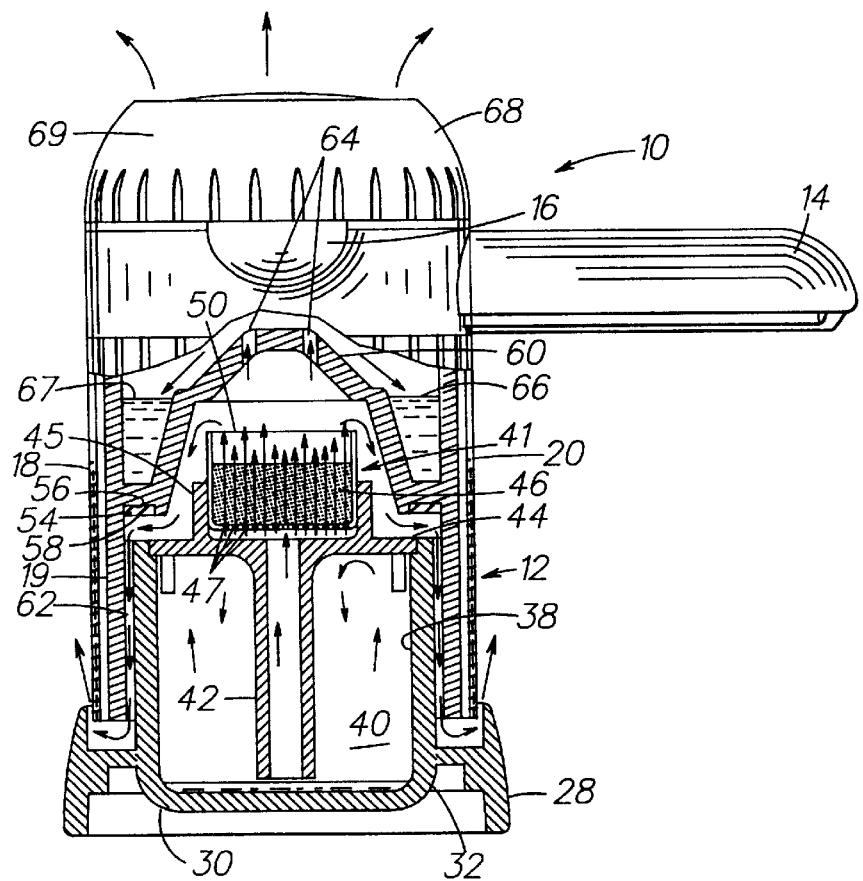
FIG. 3 is a view similar to that shown in FIG. 2 illustrating the hot beverage maker in a second operating position.
Figure 4:
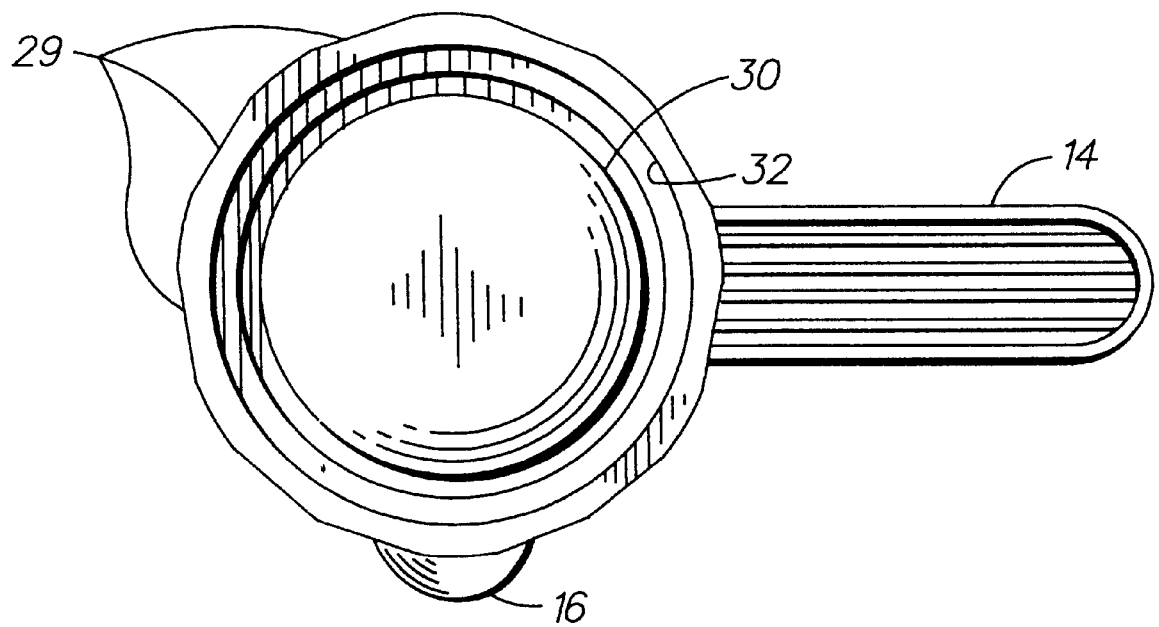
FIG. 4 is a bottom plan view of the hot beverage maker illustrated in FIG. 1.

Referring specifically to FIGS. 2, 3 and 4, details of coffeemaker 10 shall now be more fully described. Reference may also be made to copending application, Ser. No.

08/610,840 filed Mar. 5, 1996, now U.S. Pat. No. 5,747,782, which is a continuation of Ser. No. 08/458,309 filed Jun. 2, 1995, now abandoned, which is a continuation of Ser. No. 08/037,814 filed Mar. 26, 1993 in the name of Mario Orrico et al for a more detailed description of coffeemaker 10. The specification of the copending application is incorporated herein by reference.

Container or reservoir 26 further includes an inner cylindrical member 30. Member 30 is cup-shaped and includes an inner surface 38 forming a fluid reservoir or container 40. As shown in FIGS. 2 and 3, the outer surface of cylindrical member 30 is spaced radially inwardly from the inner surface of outer cylindrical member 28 to form air gap 32 between the two surfaces. The function of the air gap will be more fully explained hereinafter.

A filter assembly 41 is inserted into the open upper end of inner cylindrical member 30. Filter assembly 41 includes a tubular member 42 extending downwardly into reservoir 40. Tubular member 42 terminates at a generally cylindrical flange-like surface 44. Flange-like surface 44 has an upstanding cylindrical section 45 extending therefrom. A filter basket 46, preferably made from metal such as aluminum, is supported within cylindrical section 45. The aluminum filter basket acts as a shield for the coffeegrind to prevent the grind from being burnt during the brewing process by the microwaves. The coffee grind from which the filtrate will be made is placed within filter basket 46 and supported on the lower wall 47 thereof. Wall 47 includes a plurality of small openings through which water from reservoir 40 flows. A removable filter sieve 50 is placed over the open top of filter basket 46.

Filtrate or drink container 12 includes outer sleeve 18 and inner shell 19. Inner wall 67 of shell 19 forms a drink or filtrate reservoir 66 Shell 19 also includes a conically-shaped tubular liquid inlet 60. Inlet 60 includes openings 64. Shell 19 includes an annular slot 56 formed on the surface 58 facing flange 44. A gasket 54 is mounted within slot 56. During normal operation of the brewing cycle, gasket 54 is squeezed between the opposed surfaces of flange 44 and slot 56 to provide a seal.

A cap or lid 68 is removably mounted on the upper surface of drink container 12. Lid 68 includes outer sleeve 69. Sleeve 69 is placed about the outer surface of a shell. An annular vent opening 70 is formed in the top surface of the cover.

In operation, liquid container 26 is initially separate from drink container 12. A liquid, such as water, is placed in reservoir 40 of the liquid container and a coffee grind is placed within filter basket 46. Sieve 50 is then placed over the open end of filter basket 46. Filter assembly 41 is then placed within the open end of liquid container 26. Drink container 12 and lid 68 are then placed over liquid container 26. Preferably the outer wall of inner cylindrical member 30 and the inner wall of drink container 12 are threaded to form a positive connection between the interengaged parts. The beverage maker as shown in FIG. 2 is ready to commence the brew cycle.

The assembled beverage maker 10 is then placed within a microwave oven. Liquid container is made from material that is permeable to microwaves. The oven is turned on and the water within reservoir 40 is heated. A portion of the water is converted to steam. The steam and hot water flow upwardly through tubular member 42 through the coffee grind contained in filter basket 46, thereby changing the coffee grind into a filtrate. The filtrate flows upwardly through tubular liquid inlet 60 into filtrate reservoir 66. The user then pours the filtrate into a cup via spout 16.

The outer surface of inner cylindrical member 30 becomes quite hot during the brewing cycle. However, air gap 32 between the outer surface of inner cylindrical member 30 and inner surface of outer cylindrical member 28 forms an insulating barrier to minimize the heat transfer from the inner cylindrical member to the outer member. The exterior surface of the outer cylindrical member remains relatively cool to the user's touch.

After a relatively short period of time after completion of the brewing cycle, the user may grasp outer cylindrical member 28 at finger gripping surfaces 29. Reservoir 26, which is threadably connected to filtrate or drink container 12 is detached therefrom to enable the user to remove the filter assembly 40 from the liquid container, dispose of the used grind, and insert new grind if so desired. Any steam which remains in the reservoir 26 flows upwardly as shown by the arrows in FIG. 3 and passes between the now separated surfaces of flange 44 and gasket 54 mounted on surface 58. The steam then flows downwardly through space 62 formed between the outer surface of inner cylindrical member 30 and the inner surface of outer cylindrical member 28 and is then directed upwardly away from the user's hand via longitudinally extending grooves 20. The combination of insulating gap or barrier 32 between the inner surface of cylindrical member 28 and the outer surface of member 30, together with longitudinally extending grooves 20 substantially eliminates the possibility of user discomfort. The external gripping areas 29 are maintained at a relatively low temperature and the steam is directed upwardly away from such gripping areas.

While a preferred embodiment of the present invention has been described and illustrated, the invention should not be limited thereto but may be otherwise embodied within the scope of the following claims.

What is claimed is:

1. An apparatus for preparing beverages comprising:
 a liquid container capable of containing a liquid and comprised of a material permeable to microwaves;
 a drink medium container for holding a drink medium and including an upper housing, a tubular member extending downwardly from the upper housing, said upper housing including a filter body therein and a second filter spaced above said filter body for substantially retaining the drink medium while permitting the passage of liquid and steam, said drink medium container being insertable into said liquid container;
 a filtrate container detachably connectable to the liquid container, said drink medium container being connected to the liquid container such that the drink medium container is generally intermediate the liquid container and the filtrate container, said filtrate container having a tubular liquid inlet in fluid flow communication with said drink medium container whereby fluid can flow upward from said liquid container through said tubular member, said filter body and through said tubular liquid inlet into said filtrate container; and said liquid container comprising a first outer cylindrical member and a second cylindrical member radially inwardly spaced from said first cylindrical member, said second inner cylindrical member including an inner surface forming a water reservoir.

2. The apparatus in accordance with claim 1 wherein said first cylindrical member includes an outer surface, said outer surface including a plurality of circumferentially spaced finger grip details.

3. The apparatus in accordance with claim 2 wherein said outer surface is tapered so that a lower portion is radially wider relative to an upper portion thereof, said finger grip details being formed on the lower portion.

4. The apparatus in accordance with claim 3 wherein said filtrate container includes an outer surface having a plurality of longitudinally extending grooves.

5. The apparatus in accordance with claim 1 wherein said filtrate container includes an outer surface having a plurality of longitudinally extending grooves.

6. An apparatus for preparing beverages comprising:

a liquid container capable of containing a liquid;

a drink medium container having a housing and a tubular member extending downwardly from said housing into said liquid container;

a filter apparatus associated with said housing for containing a drink medium;

a drink container detachably connected to the liquid container including a tubular liquid inlet for placing said liquid container in fluid communication with said drink container whereby fluid can flow upward from said liquid container through the tubular member, filter apparatus and through said tubular liquid inlet into said drink container, said liquid container comprising a material permeable to microwaves whereby, upon heating with microwave energy, liquid and steam formed in the liquid container is pressurized and directed through the tubular member and filter apparatus containing the drink medium and into the drink container; and said drink container including an outer surface having a plurality longitudinally extending grooves which extend upward from a junction of the outer surface of said drink container with a surface of the liquid container.

7. The apparatus in accordance with claim 6 wherein said liquid container includes an outer sleeve extending radially outward from a flange-like surface and an inner wall spaced from said outer sleeve, said outer surface of said drink container being sandwiched between said outer sleeve and inner wall of said liquid container such that a portion of said outer sleeve overlays a portion of said outer surface.

8. The apparatus in accordance with claim 7 wherein a gap is formed between said outer surface and said outer sleeve when connected in overlapping relationship.

9. The apparatus in accordance with claim 8 wherein said outer sleeve is tapered so that a lower portion is radially wider relative to an inner portion, said lower portion including a plurality of circumferentially spaced finger grip details.

10. The apparatus in accordance with claim 7 wherein said outer sleeve is tapered so that a lower portion is radially wider relative to an inner portion, said lower portion including a plurality of circumferentially spaced finger grip details.

11. A method for preparing a beverage in a microwave oven comprising the steps of:

placing a liquid into a liquid container;

placing a drink medium into a drink medium holder;

assembling the drink medium holder into the liquid container;

joining the drink medium holder and liquid container to a drink container in an assembly permitting fluid flow therebetween, thereby forming a drink market;

providing a user finger gripping section on an outer surface of the liquid container;

thermally insulating the finger gripping section of the liquid container from the liquid containing portion thereof;

placing the drink maker into a microwave oven;

activating the oven to subject the liquid in the liquid container to microwave energy;

heating the liquid and converting a portion thereof to steam; and maintaining the temperature of the finger gripping section at a relatively low temperature level while the liquid container is subjected to microwave energy.

12. The method in accordance with claim 11 further comprising:

partially disassembling the liquid container from the drink container after the microwave oven has been deactuated; and directing steam venting from the partially disassembled liquid container upwardly away from the finger gripping section of the liquid container.

13. The method in accordance with claim 12 wherein the step of thermally insulating includes forming an air barrier between the finger gripping section and the liquid containing portion.

14. The method in accordance with claim 11 wherein the step of thermally insulating includes forming an air barrier between the finger gripping section and the liquid containing portion.

* * * * *